United States Patent
Lee et al.

(10) Patent No.: US 10,491,363 B2
(45) Date of Patent: Nov. 26, 2019

(54) METHOD FOR TRANSMITTING A DATA IN A COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 63 days.

(21) Appl. No.: 15/604,050

(22) Filed: May 24, 2017

(65) Prior Publication Data

US 2017/0347369 A1    Nov. 30, 2017

Related U.S. Application Data

(60) Provisional application No. 62/341,050, filed on May 24, 2016.

(51) Int. Cl.
    *H04L 5/16*    (2006.01)
    *H04L 5/00*    (2006.01)
    *H04W 72/12*   (2009.01)

(52) U.S. Cl.
    CPC ............. *H04L 5/16* (2013.01); *H04L 5/003* (2013.01); *H04W 72/1284* (2013.01)

(58) Field of Classification Search
    CPC ....... H04L 5/16; H04L 5/003; H04W 72/1284
    See application file for complete search history.

(56) References Cited

U.S. PATENT DOCUMENTS

2013/0235468 A1*    9/2013   Yanai ............... G02B 13/009
                                                            359/687

* cited by examiner

*Primary Examiner* — Duc C Ho
(74) *Attorney, Agent, or Firm* — Birch, Stewart, Kolasch & Birch, LLP (57) ABSTRACT

The present invention relates to a wireless communication system. More specifically, the present invention relates to a method and a device for transmitting, by a user equipment (UE), data in a wireless communication system, the method comprising: receiving a physical downlink control channel (PDCCH) scheduling a physical downlink shared channel (PDSCH); triggering transmission of a scheduling request (SR); and if a transmission time interval (TTI) for an SR transmission is part of reception of the PDSCH, instructing a physical layer to transmit the SR after the PDSCH reception is completed.

8 Claims, 9 Drawing Sheets

(a) Control-Plane Protocol Stack (b) User-Plane Protocol Stack

METHOD FOR TRANSMITTING A DATA IN A COMMUNICATION SYSTEM AND DEVICE THEREFOR

CROSS-REFERENCE TO RELATED APPLICATION

This application claims priority to Provisional Application No. 62/341,050 filed on May 24, 2016, which is hereby incorporated by reference as if fully set forth herein.

BACKGROUND OF THE INVENTION

Field of the Invention

The present invention relates to a wireless communication system and, more particularly, to a method for transmitting data in a communication system and a device therefor.

Discussion of the Related Art

Figure 1:
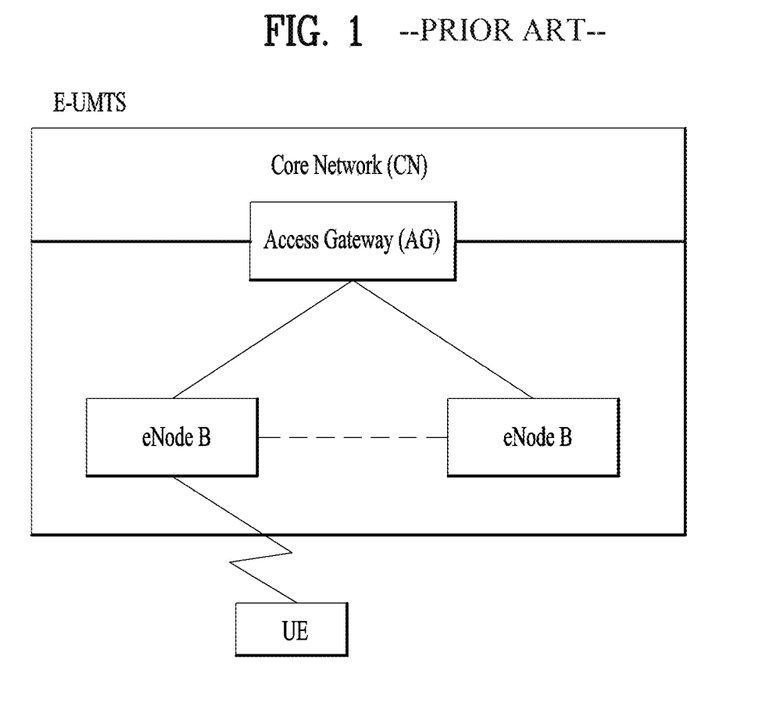
FIG. 1 is a diagram showing a network structure of an Evolved Universal Mobile Telecommunications System (E-UMTS) as an example of a wireless communication system.

As an example of a mobile communication system to which the present invention is applicable, a 3rd Generation Partnership Project Long Term Evolution (hereinafter, referred to as LTE) communication system is described in brief FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for transmitting, by a user equipment (UE), data in a wireless communication system, the method comprising: receiving a physical downlink control channel (PDCCH) scheduling a physical downlink shared channel (PDSCH); triggering transmission of a scheduling request (SR); and if a transmission time interval (TTI) for an SR transmission is part of reception of the PDSCH, instructing a physical layer to transmit the SR after the PDSCH reception is completed.

In another aspect of the present invention provided herein is an UE operating in wireless communication system, the UE comprising: a radio frequency (RF) module configured to transmit/receive signals to/from a network; and a processor configured to control the RF module to receive a physical downlink control channel (PDCCH) scheduling a physical downlink shared channel (PDSCH), trigger transmission of a scheduling request (SR), and if a transmission time interval (TTI) for an SR transmission is part of reception of the PDSCH, instruct a physical layer to transmit the SR after the PDSCH reception is completed.

If the TTI is not part of reception of the PDSCH, the method further comprising instructing the physical layer to transmit the SR in the TTI.

Preferably, the UE operates in half duplex-frequency division duplexing (HD-FDD).

Preferably, the SR transmission is a part of repeated SR transmission in a SR bundle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
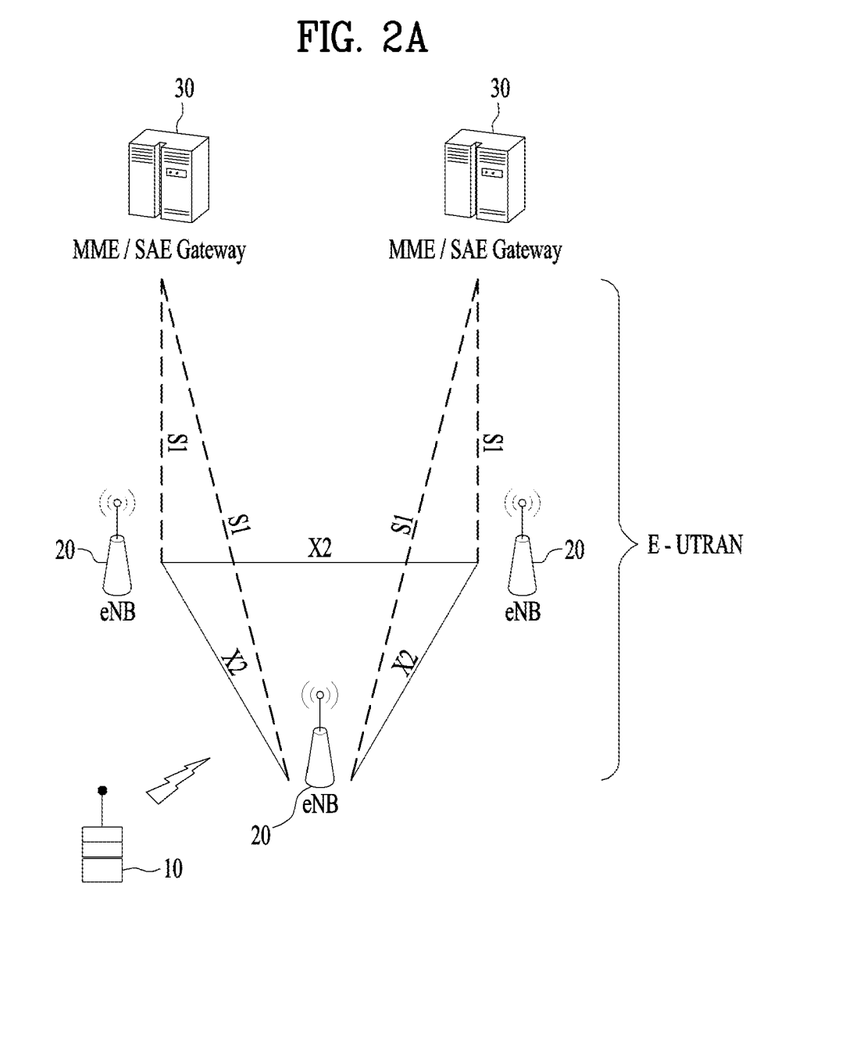
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
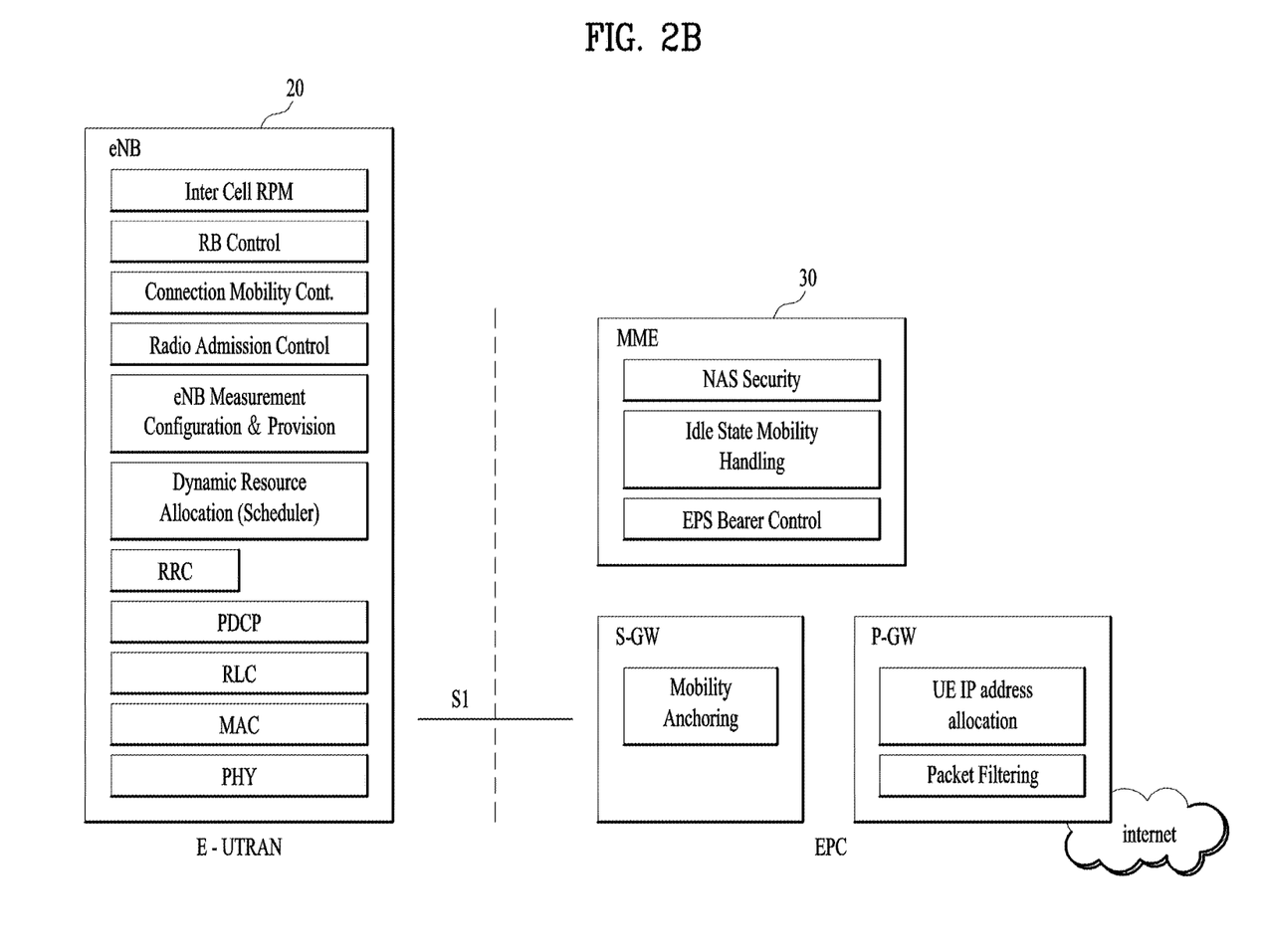
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
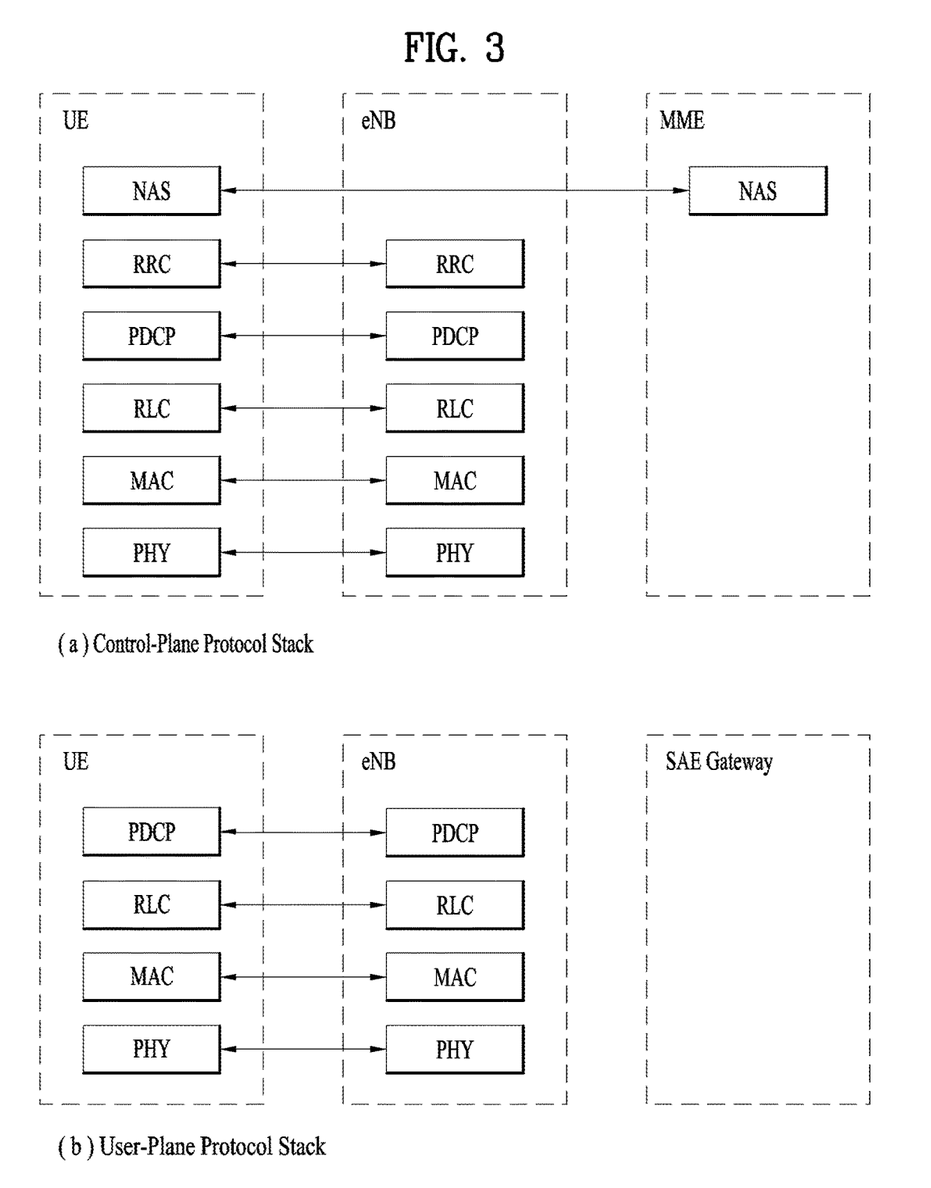
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
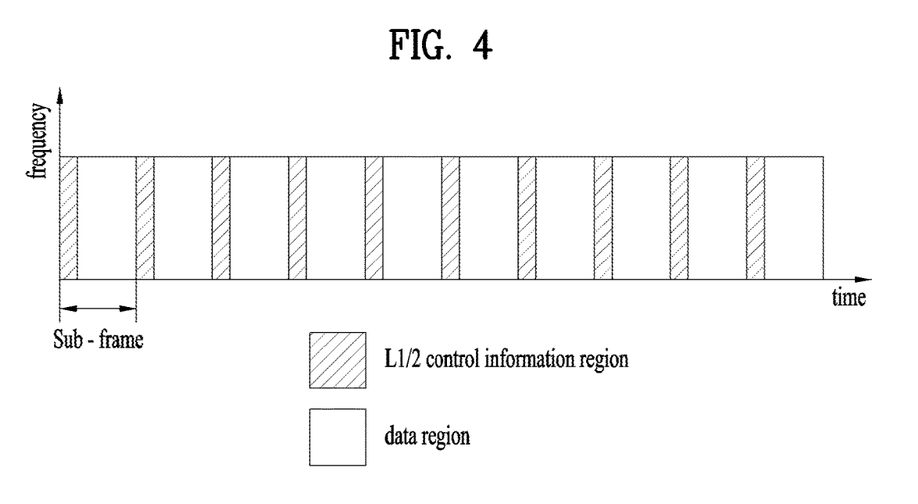
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
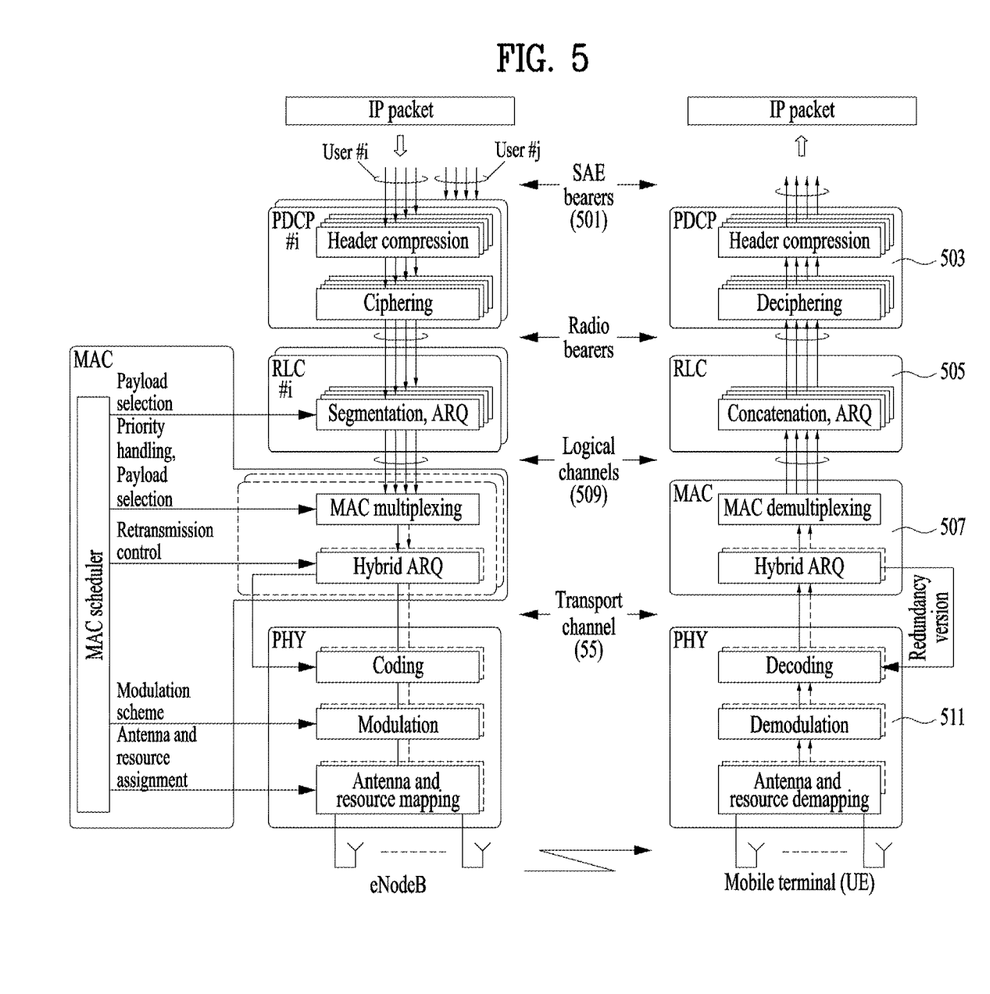
FIG. 5 is a diagram for a general overview of the LTE protocol architecture for the downlink.

FIG. 5 is a diagram for a general overview of the LTE protocol architecture for the downlink.

A general overview of the LTE protocol architecture for the downlink is illustrated in FIG. 5. Furthermore, the LTE protocol structure related to uplink transmissions is similar to the downlink structure in FIG. 5, although there are differences with respect to transport format selection and multi-antenna transmission.

Data to be transmitted in the downlink enters in the form of IP packets on one of the SAE bearers (501). Prior to transmission over the radio interface, incoming IP packets are passed through multiple protocol entities, summarized below and described in more detail in the following sections:

Packet Data Convergence Protocol (PDCP, 503) performs IP header compression to reduce the number of bits necessary to transmit over the radio interface. The header-compression mechanism is based on ROHC, a standardized header-compression algorithm used in WCDMA as well as several other mobile-communication standards. PDCP (503) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 505) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (505) offers services to the PDCP (503) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 507) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (507) offers services to the RLC (505) in the form of logical channels (509).

Physical Layer (PHY, 511), handles coding/decoding, modulation/demodulation, multi-antenna mapping, and other typical physical layer functions. The physical layer (511) offers services to the MAC layer (507) in the form of transport channels (513).

The Scheduling Request (SR) is used for requesting UL-SCH resources for new transmission. When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR, or when the UL grant(s) can accommodate all pending data available for transmission.

If an SR is triggered and there is no other SR pending, the UE may set the SR_COUNTER to 0.

As long as one SR is pending, if no UL-SCH resources are available for a transmission in this TTI, the UE may initiate a Random Access procedure on a PCell and cancel all pending SRs if the UE has no valid PUCCH resource for SR configured in any TTI.

Else if the UE has a valid PUCCH resource for SR configured for this TTI and if this TTI is not part of a measurement gap and if sr-ProhibitTimer is not running, if SR_COUNTER<dsr-TransMax, the UE may increment SR_COUNTER by 1, instruct the physical layer to signal the SR on PUCCH, and start the sr-ProhibitTimer.

If SR_COUNTER≥dsr-TransMax, the UE may notify RRC to release PUCCH/SRS for all serving cells, clear any configured downlink assignments and uplink grants, and initiate a Random Access procedure on the PCell and cancel all pending SRs.

Figure 6:
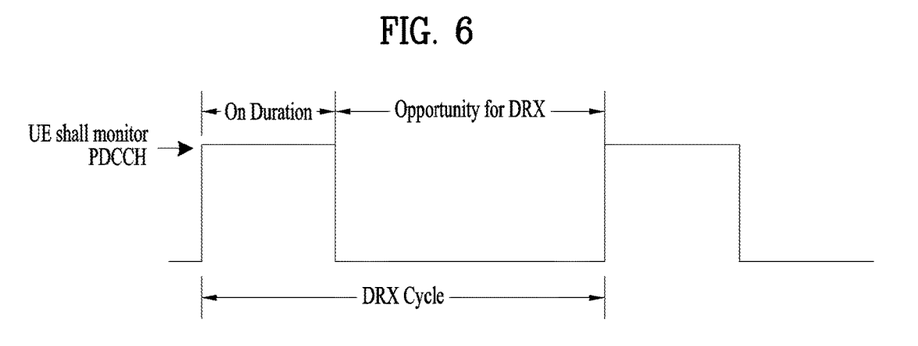
FIG. 6 is a diagram showing a concept DRX (Discontinuous Reception) operation.

FIG. 6 is a diagram showing a concept DRX (Discontinuous Reception) operation.

Referring to FIG. 6, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE may need to additionally monitor a PDCCH during a time period other than the On Duration. That is, the UE should perform PDCCH monitoring during a time period over which an inactivity managing timer, drx-InactivityTimer or a retransmission managing timer, drx-RetransmissionTimer, On Duration managing timer, or onDurationTimer is running.

The value of each of the timers is defined as the number of subframes. The number of subframes is counted until a timer is reached to the value. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Additionally, the UE may need to perform PDCCH monitoring during random access (e.g., during mac-ContentionResolutionTimer is running) or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 7:
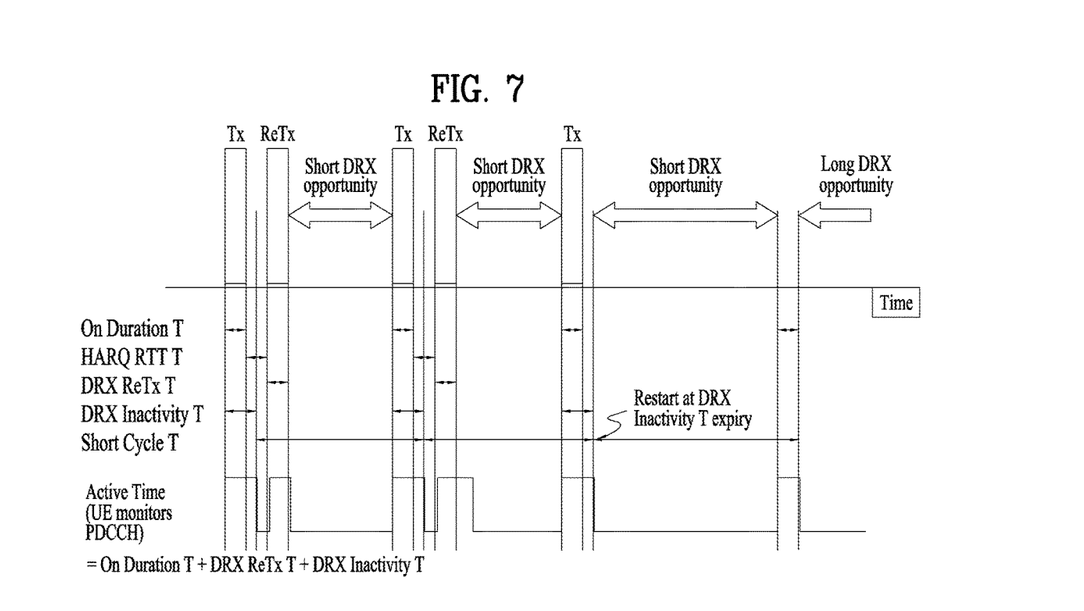
FIG. 7 is a diagram showing a method for a DRX operation in the LTE system.

FIG. 7 is a diagram showing a method for a DRX operation in the LTE system.

Referring to FIG. 7, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer (i.e., a state of no PDCCH monitoring), and use the Short DRX Cycle. However, if the Short DRX cycle is not configured, the Long DRX cycle is used. Additionally, if drxShortCycleTimer expires in this subframe, the Long DRX Cycle is also used.

In the current MAC technical specification (e.g., 3GPP TS 36.321), when DRX functionality is configured for the UE, the UE checks, in each subframe, whether to start onDurationTimer as follows:

If the Short DRX Cycle is used and [(SFN*10)+
subframe number] modulo (shortDRX-Cycle) is
(drxStartOffset) modulo (shortDRX-Cycle), or If the Long DRX Cycle is used and [(SFN*10)+
subframe number] modulo (longDRX-Cycle) is
drxStartOffset, the UE shall start onDuration-
Timer. [Equation A]

According to the equation A (so-called, modulo-DRX Cycle check), the On Duration appears once per one DRX cycle because it is assumed that the length of DRX cycle is shorter than the maximum SFN value, i.e., the maximum SFN value is currently at most 1023, and the DRX cycle is at most 2560 subframes. If the DRX cycle is set to longer than the 'maximum SFN value*10', e.g., 10230 subframes, in order to further reduce the UE's power consumption, On Duration would appear several times within one DRX cycle.

The UE shall monitor a PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL, UL, or SL) new transmission, the UE shall start or restart drx-InactivityTimer.

Meanwhile, when not in Active Time, the UE does not perform a SRS (Sounding Reference Signal) transmission and a CSI reporting, which are triggered by the eNB, and PDCCH monitoring.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

With repetition transmission where PDSCH repetition occurs on different subframes following PDCCH repetition, the UE may be expected to receive PDSCH repetition even though the UE is not in Active Time as long as the UE successfully receives the PDCCH repetition within the Active Time.

In the meanwhile, the UE may operate in half duplex-frequency division duplexing (HD-FDD). For half-duplex FDD UE, the UE may monitor the PDCCH only when the PDCCH-subframe is not required for uplink transmission during Active Time. This implies that if SR is triggered and to be transmitted during PDCCH repetition, the UE will prioritize sending SR over PDCCH monitoring. However, if SR is triggered and to be transmitted during PDSCH repetition, the UE behavior is not specified. The reason is that there has been no such case give that PDCCH and PDSCH are always transmitted in the same subframe.

Applying the same rule for the PDCCH, the UE may prioritize transmitting SR over PDSCH reception. However, it wouldn't be desirable because SR transmission number can be configured up to 32 and it is waste of DL resource to ignore PDSCH reception only after successfully receiving PDCCH repetitions. Therefore, a new mechanism is required in order for the UE to keep receiving PDSCH if PDCCH scheduling the PDSCH is successfully received and/or decoded by the UE.

Figure 8:
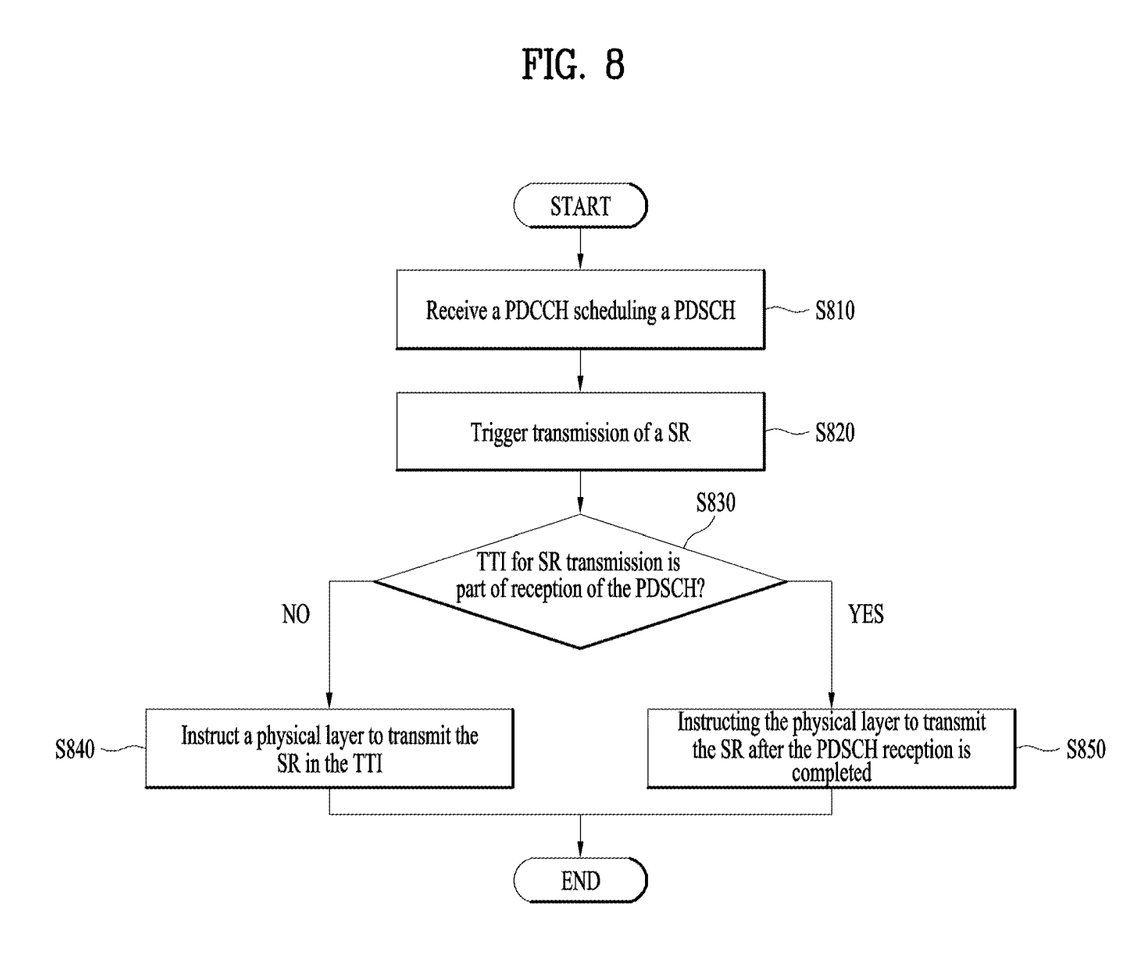
FIG. 8 is a flow chart for transmitting an SR according to an embodiment of the present invention.

FIG. 8 is a flow chart for transmitting an SR according to an embodiment of the present invention.

Referring to FIG. 8, the UE may receive a PDCCH scheduling a PDSCH (S810). For example, the MAC layer may perform downlink reception from an eNB by receiving at least one PDCCH and at least one PDSCH. At this, the at least one PDCCH and the at least one PDSCH may be received on different subframes. In other word, the TTI for receiving the at least one PDCCH and the TTI for receiving the at least one PDSCH may be different. The at least one PDCCH may schedule the corresponding at least one PDSCH. When the MAC layer successfully receives or decodes the at least one PDCCH, the MAC layer knows in which subframes the MAC layer is to receive the corresponding PDSCH.

After the MAC layer successfully receives or decodes the at least one PDCCH, a transmission of SR may be triggered (S820). The transmission of SR may be triggered based on the SR triggering condition. For example, if the UE has a valid PUCCH resource for SR configured for a TTI and if the TTI is not part of a measurement gap and if sr-ProhibitTimer is not running, if SR_COUNTER<dsr-TransMax, the UE may instruct the physical layer to signal the SR on PUCCH.

When the SR is triggered, the UE may consider a SR delay condition. This SR delay condition can be combined with the above trigger condition. For example, the MAC layer may check a SR delay condition. The SR delay condition may include at least one of (i) if the corresponding PDSCH reception is on-going; or (ii) if the corresponding PDSCH reception is to be expected even though is not currently on-going; or (iii) if the corresponding PDSCH reception is to be expected even though is not currently on-going, and if the SR transmission is overlapped with the expected PDSCH reception.

If any SR repetition is collided with the expected PDSCH reception, the SR transmission may be considered to be overlapped with the expected PDSCH reception. Or, if all SR repetition is collided with the expected PDSCH reception, the SR transmission is considered to be overlapped with the expected PDSCH reception.

In other word, the UE may consider whether the TTI for SR transmission is part of reception of the PDSCH (S830). As an example, the terminal may consider whether the TTI is not part of PDSCH reception, and/or whether any valid PUCCH resource for SR is not collided with any part of PDSCH reception.

If the TTI for an SR transmission is not part of reception of the PDSCH, the UE may instruct a physical layer to transmit the SR in the TTI (S840). If the physical layer receives the instruction, the physical layer may transmit SR repeatedly to the eNB. As an example, the SR transmission may be a part of repeated SR transmission in a SR bundle.

On the other hand, the TTI for an SR transmission is part of reception of the PDSCH, the UE may instruct the physical layer to transmit the SR after the PDSCH reception is completed (S850). For example, if the SR delay condition is satisfied, the MAC layer may consider that the triggered SR is pending and/or the MAC layer may delay instruction of SR transmission to the physical layer until when the MAC layer completes receiving the corresponding PDSCH. In other word, when the MAC layer completes the corresponding PDSCH reception, the MAC layer may instruct the physical layer to signal the SR on one valid PUCCH resource for SR. in addition, the MAC layer may instruct the physical layer to increase SR_COUNTER by 1, and start the sr-ProhibitTimer.

Figure 9:
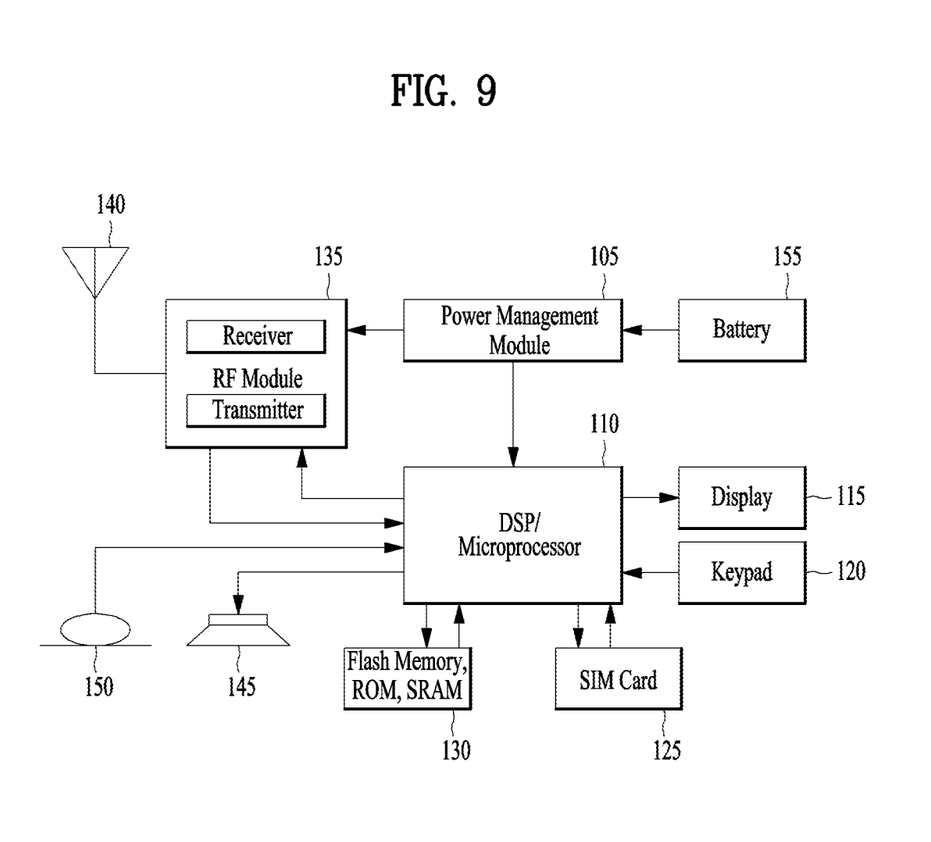
FIG. 9 is a block diagram of a communication apparatus according to an embodiment of the present invention

FIG. 9 is a block diagram of a communication apparatus according to an embodiment of the present invention.

The apparatus shown in FIG. 9 can be a user equipment (UE) and/or eNB adapted to perform the above mechanism, but it can be any apparatus for performing the same operation.

As shown in FIG. 9, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 9 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 9 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. The processor (110) is configured to perform operations according to the embodiment of the present invention exemplarily described with reference to the accompanying drawings. In particular, the detailed operations of the processor (110) can refer to the contents described with reference to FIGS. 1 to 8.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

What is claimed is:

1. A method for transmitting, by a user equipment (UE), a scheduling request (SR) in a wireless communication system, the method comprising:
    receiving, from a base station, a physical downlink control channel (PDCCH) scheduling a physical downlink shared channel (PDSCH);
    triggering transmission of the SR by a medium access control (MAC) layer; and
    when a transmission time interval (TTI) for an SR transmission is a part of reception of the PDSCH, instructing a physical layer to transmit the SR to the base station after the PDSCH reception is completed.

2. The method of claim 1, further comprising:
    when the TTI for the SR transmission is not the part of reception of the PDSCH, instructing the physical layer to transmit the SR in the TTI.

3. The method of claim 1, wherein the UE operates in half duplex-frequency division duplexing (HD-FDD).

4. The method of claim 1, wherein the SR transmission is a part of repeated SR transmission in a SR bundle.

5. A user equipment (UE) in a wireless communication system, the UE comprising:
- a transceiver configured to transmit/receive signals to/from a network; and
- a processor configured to process the signals,
- wherein the processor is configured to:
    - control the transceiver to receive, from a base station, a physical downlink control channel (PDCCH) scheduling a physical downlink shared channel (PDSCH),
    - trigger transmission of a scheduling request (SR) by a medium access control (MAC) layer, and
    - when a transmission time interval (TTI) for an SR transmission is a part of reception of the PDSCH, instruct a physical layer to transmit the SR to the base station after the PDSCH reception is completed.

6. The UE of claim 5, wherein when the TTI for the SR transmission is not the part of reception of the PDSCH, the processor is further configured to instruct the physical layer to transmit the SR in the TTI.

7. The UE of claim 5, wherein the UE operates in half duplex-frequency division duplexing (HD-FDD).

8. The UE of claim 5, wherein the SR transmission is a part of repeated SR transmission in a SR bundle.

* * * * *